Jan. 13, 1942.  W. GLOWASKI  2,269,659
ROCK DRILL ATTACHMENT
Filed June 10, 1940
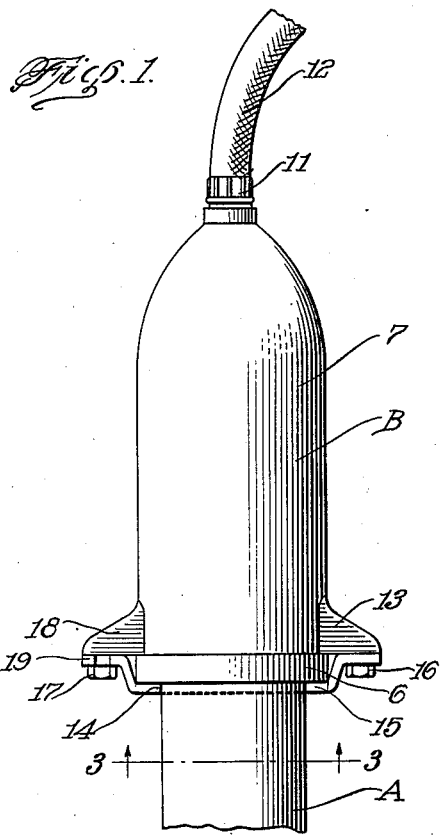
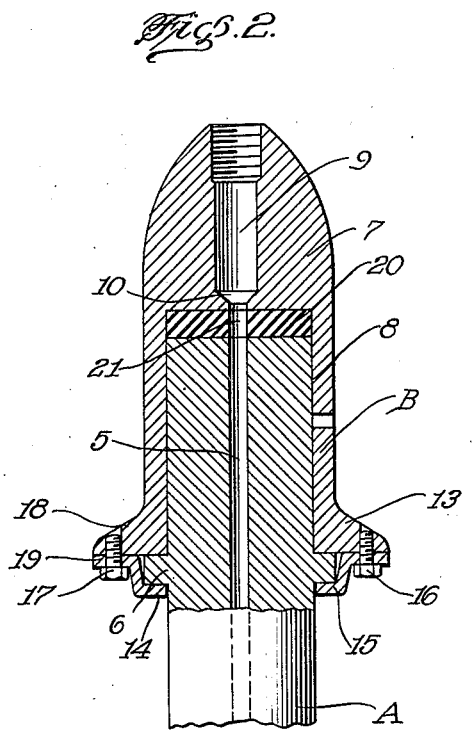
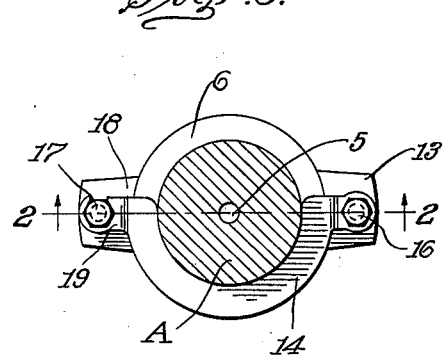
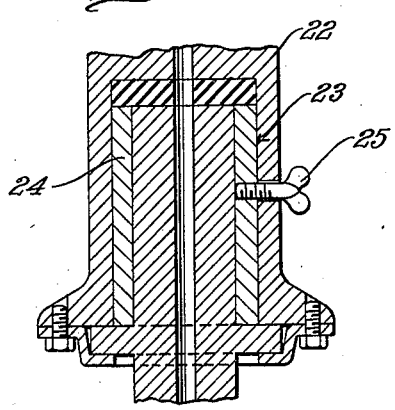
William Glowaski
INVENTOR
BY Victor J. Evans & Co.
ATTORNEYS Patented Jan. 13, 1942

2,269,659

UNITED STATES PATENT OFFICE 2,269,659

ROCK DRILL ATTACHMENT

William Glowaski, St. Paul, Minn.

Application June 10, 1940, Serial No. 339,818

3 Claims. (Cl. 285—161)

The invention relates to a rock drill attachment and more especially to a device for removing stuck drills through the instrumentality of air under pressure.

The primary object of the invention is the provision of a device of this character wherein on the fitting thereof with a drill stuck in work will enable the said drill to be withdrawn or removed from the work without possibility of damaging such drill, the removal being effected by the delivery of air under pressure to the point where the said drill has become stuck in the work so as to extricate the said drill from the hole made thereby, particularly where loose material has become packed about the said drill within such hole with the resultant sticking of the drill therein.

Another object of the invention is the provision of a device of this character wherein the construction thereof is such as to have it adapt itself to drills of different cross sectional diameters and to assure the delivery of air under pressure to the drill without loss of air and with effectiveness for removing the stuck drill.

A further object of the invention is the provision of a device of this character wherein a direct force of air under pressure can be delivered to the drill when stuck in a hole formed thereby so that its removal can be had with dispatch and ease and without liability of damaging the drill, the device being releasably coupled with the shank of a drill and can not become accidentally detached when in working relation thereto.

A still further object of the invention is the provision of a device of this character, which is simple in its construction, thoroughly reliable and efficient in operation, being possessed of few parts, readily and easily applied and detached to and from a drill shank, and when in applied position delivers air under pressure directly to the drill for enabling the extracting of the drill from a hole with dispatch, and inexpensive to manufacture.

With these and other objects in view, the invention consists in the features of construction, combination and arrangement of parts as will be hereinafter more fully described in detail, illustrated in the accompanying drawing, which discloses the preferred and modified forms of the invention and pointed out in the claims hereunto appended.

In the accompanying drawing:

Figure 1 is a side elevation of a device constructed in accordance with the invention, a portion of a drill shank being fitted thereto.

Figure 2 is a longitudinal sectional view through the device and taken partly through the drill shank.

Figure 3 is a sectional view taken on the line 3—3 of Figure 1 looking in the direction of the arrows.

Figure 4 is a view similar to Figure 2 showing a slight modification of the invention.

Similar reference characters indicate corresponding parts throughout the several views in the drawing.

Referring to the drawing in detail, A designates generally a portion of a drill shank, the drill being of the rock drilling type, while separably attached to the said shank is the device generally denoted at B constituting the present invention and hereinafter fully described.

The drill shank A is formed with a central air passage or bore 5, which opens through the work-engaging end and the opposite end remote therefrom of the said drill. This shank A externally thereof is formed with an annular bead or shoulder 6, being removed from the end remote from the work-engaging end of said drill for cooperation with the device B to enable the separable fastening of the latter with said drill.

The device B comprises a cylindrical capping body 7 having therein a socket 8 opening through one end for removably accommodating the shank A adjacent to the shoulder 6 externally thereon. The body 7 is formed with an air inlet 9 opening into the socket 8, being in alignment with the passage 5 in the shank A but of increased diameter relative thereto with an inner restricted portion 10 registering with the said passage 5 and establishing communication between this inlet 9 and the said socket 8. Tapped into the inlet 9 is a hose coupling nipple 11 for a hose, a portion thereof being indicated at 12. This hose 12 leads from a compressed air storage tank (not shown) or an air pump, compressor or the like which is not shown.

Swingably connected to a pivot ear 13 formed exteriorly on the body 7 at one side of the socket 8 opening through an end of the said body is a half circular-shaped latching yoke 14, being flanged at 15 for engaging or overlapping the shoulder 6 on the shank A of the drill for removably fitting the said shank A in the socket 8 in the body 7. The yoke 14 is swingably connected to the ear 13 by a screw 16 and such yoke is secured in a latching position with respect to the shank A of the drill by a fastening screw 17, which is engaged in an ear 18 formed exteriorly on the body 7 diametrically opposite the ear 13 thereon. The yoke 14 next to the screw 17 is formed with a keeper jaw 19 for releasably receiving the fastener 17, that is to say, when the latter is unscrewed the yoke 14 can swing to unlatching position in that the jaw 19 is releasable from the said screw when engaged in the ear 18. This yoke 14, on the tightening of the screws 16 and 17, is secure on the body 7 and holds the latter fitted upon the shank A in that the latter is socketed at 8 within the said body.

Seated within the socket 8 is a centrally perforated, resilient washer 20 which abuts the end of the shank A of the drill next thereto and its center perforation 21 registers with the passage 5 in the shank A so that air under pressure will pass from the inlet 9 into the said passage and thence to the work-engaging end of the drill to extricate the latter from the hole due to the sticking of the drill therein resultant from the packing of loose material about the work-engaging end of said drill when within the hole drilled thereby.

The washer 20 is for the purpose of sealing the socketed end of the drill shank A to avoid any leakage of air under pressure from the socket 8 in the body 7 about the drill shank.

In Figure 4 of the drawing there is shown a slight modification of the invention wherein the body 22 of the device has in its socket 23 a releasable, sleevelike member 24 for the purpose of reducing the cross sectional diameter of the socket 23 from that diameter of the socket 8 shown in Figure 2 of the drawing so that a smaller drill shank may be accommodated in the device than the shank A. This member 24 is held within the socket 23 by a retaining screw 25 fitting the said body 22 and the said member, as is clearly shown in said Figure 4 of the drawing.

The device when applied to a drill, that is, by coupling the said device with the shank of such drill, enables air under pressure to be delivered to the work-engaging end of the drill for the cleaning thereof or for enabling the easy removal of the said drill from the work when such drill becomes stuck in the hole formed thereby in that the loose packed material is freed from around the drill when in the hole permitting the said drill to be withdrawn from the hole without damage thereto or to enable continued drilling operation.

What is claimed is:

1. An attachment for a drill having a shank provided with an air passage therethrough and an external annular shoulder, respectively, comprising a cup-shaped capping body forming a socket for receiving the said shank to a point of the external shoulder thereon and engaging the same and having an air inlet communicative with the air passage in said shank, means on the body for releasably engaging the lower face of the external shoulder on said shank to hold the shank in said body in engagement with the shoulder, and a perforated washer within the body between the socketed shank and the inlet in said body and having the perforation registering with the air passage in said shank and the said inlet.

2. An attachment for a drill having a shank provided with an air passage therethrough and an external annular shoulder, respectively, comprising a cup-shaped capping body forming a socket for receiving the said shank to a point of the external shoulder thereon and engaging the same and having an air inlet communicative with the air passage in said shank, means on the body for releasably engaging the lower face of the external shoulder on said shank to hold the latter socketed in said body, a perforated washer within the body between the socketed shank and the inlet in said body and having the perforation registering with the air passage in said shank and the said inlet, means for supplying air under pressure through the said inlet to the air passage in the shank, and a sleeve for surrounding the shank when socketed in the capping body.

3. The combination with a drill shank having a small air passage therethrough, an annular shoulder carried by the shank a considerable distance below the upper end thereof, an elongated cylindrical shaped socket receiving the upper end of the shank, laterally extending projections carried by the extreme lower end of the socket and resting upon the annular shoulder carried by the shank, said socket adapted to receive sleeves of different thicknesses, means extending through the wall of the socket for engaging the sleeve for holding the same in the socket, a packing covering the upper end of the shank and provided with an opening of the same size as the passage in the shank, said socket having a passage therethrough provided with an opening of the same size and communicating with the opening in the packing, and means for locking the projections on the annular shoulder.

WILLIAM GLOWASKI.